Patented Apr. 18, 1939

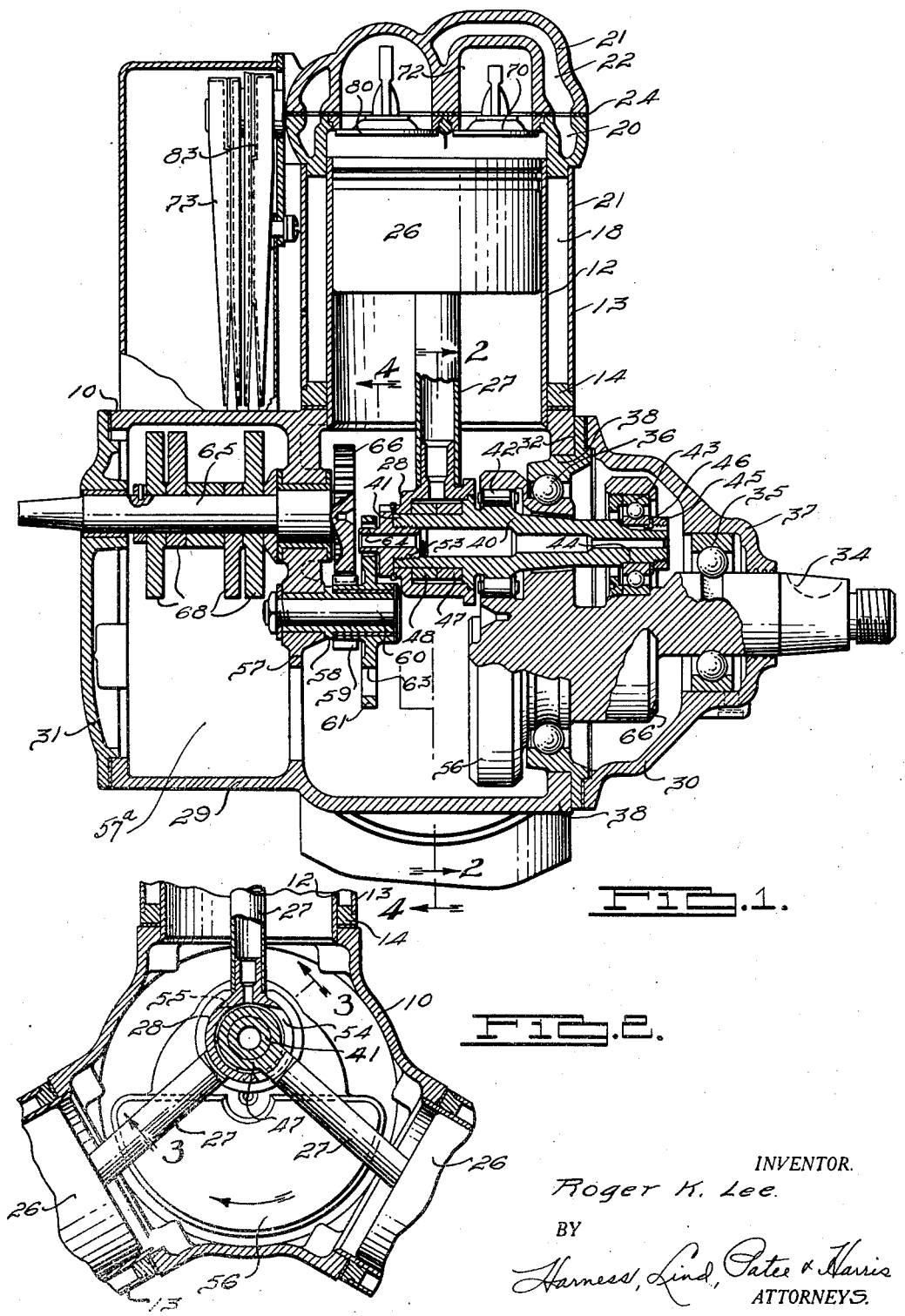

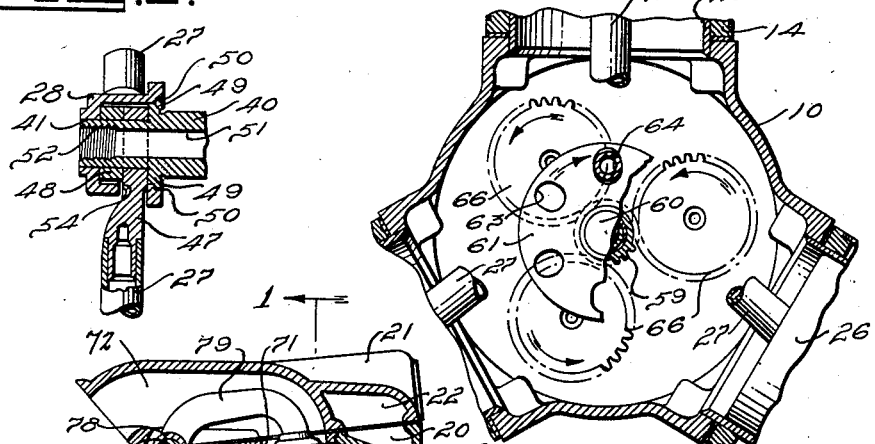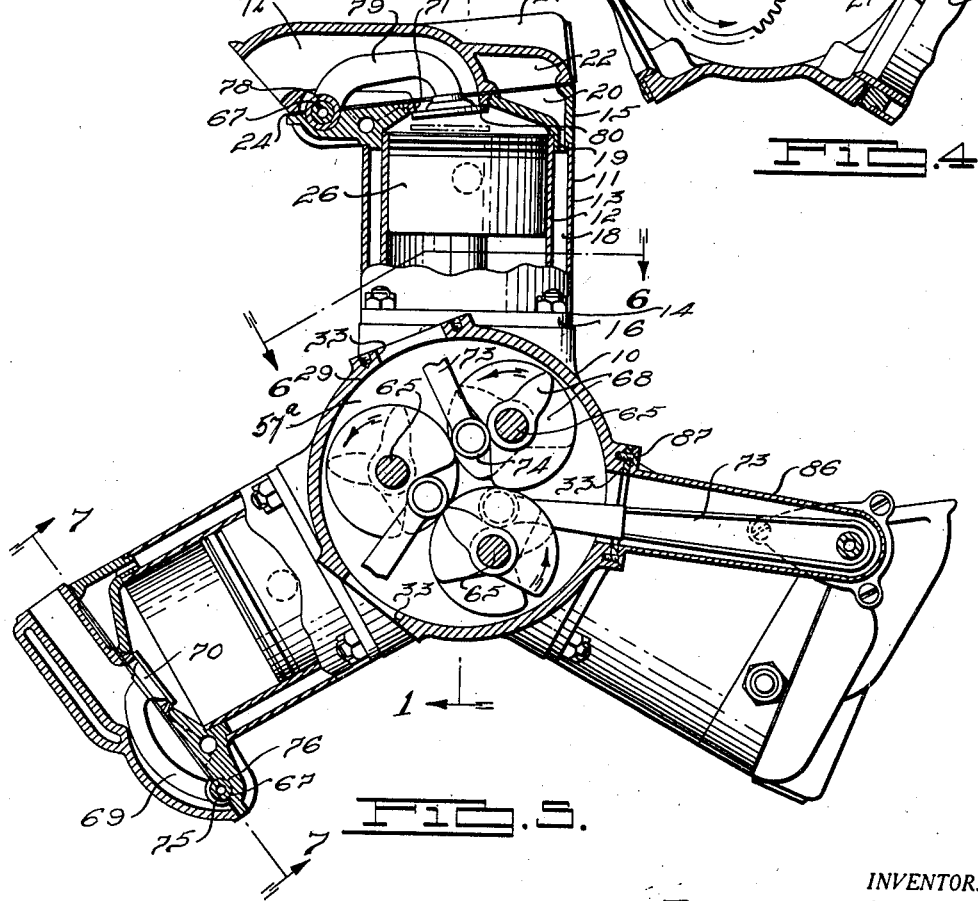

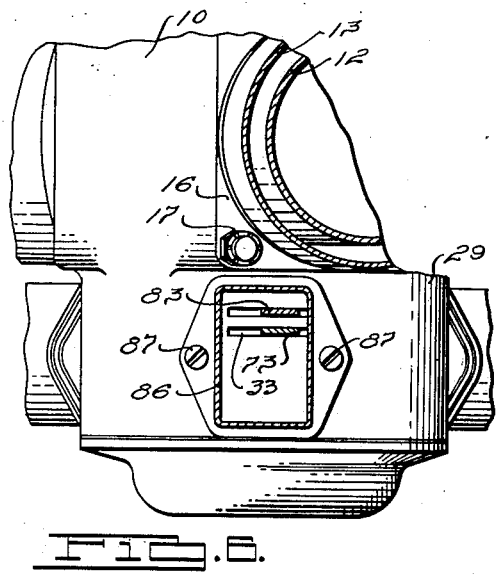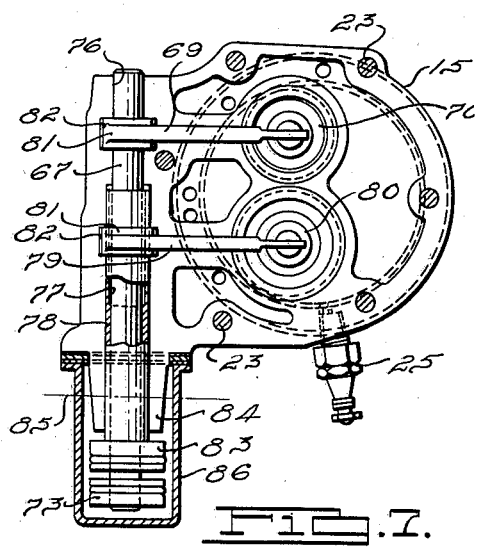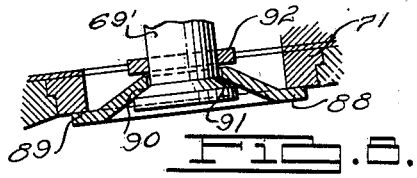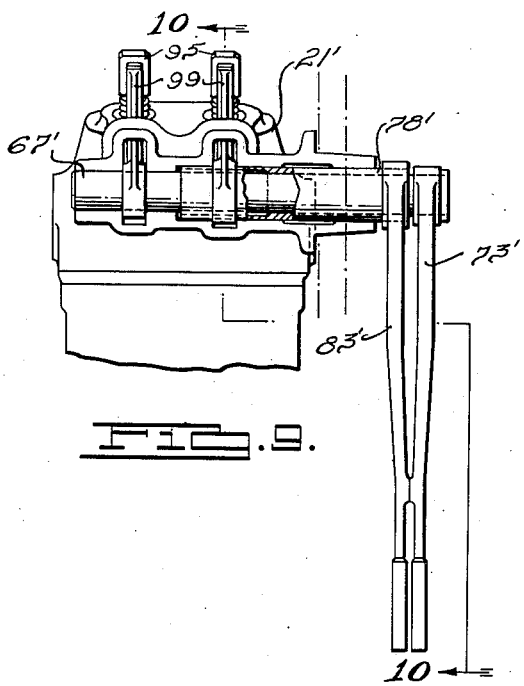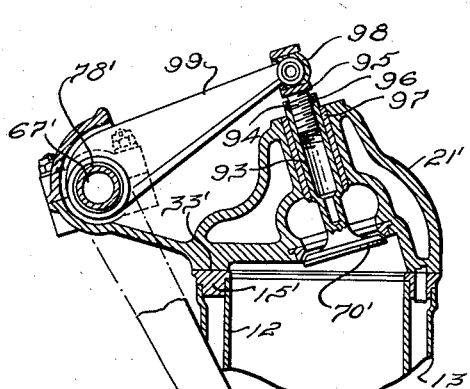

2,154,573

UNITED STATES PATENT OFFICE 2,154,573

ENGINE VALVE OPERATING MECHANISM

Roger K. Lee, Highland Park, Mich., assignor to Chrysler Corporation, Detroit, Mich., a corporation of Delaware Application May 19, 1934, Serial No. 726,488

7 Claims. (Cl. 123—90)

This invention relates to internal combustion engines and more especially to new and useful improvements for increasing the speed and efficiency of an internal combustion engine.

This application is a division of my co-pending application, Serial No. 657,146, filed February 16, 1933, now Patent No. 2,047,419.

As the art of internal combustion engines has developed there has been an increased demand for small and lighter weight power plants capable of producing definite amounts of power. The gasoline engine is the lightest known form of prime mover. In general, engines become lighter as the number of cylinders and the crank shaft speeds are increased. However, it becomes impractical to provide large numbers of cylinders for engines designed to perform certain types of duties. As engine speeds are increased, various considerations in the design of the engine become important. Among the more important of these considerations is the weight and the admission and discharge of gaseous mixtures to and from the engine cylinders.

One object of this invention is to increase the efficiency of internal combustion engines.

Another object is to reduce the resistance offered to engine operation due to inertia of valves and operating means therefor.

Another object is to provide a light weight valve operating means for positively opening and closing valves.

A still further object of my invention in its more limited aspects is to provide an arrangement of valve operating mechanisms wherein one valve operating means forms a bearing for another valve operating means.

While my improvements are not limited in their use to any particular type of engine my improvements are especially adapted to provide a compact, light weight, radial cylinder type of engine which is readily assembled and disassembled and which has a singularly low ratio of weight per horsepower.

Further objects of my invention are to provide a high speed engine valve gear operating with a minimum of vibration or other disturbing forces; and to provide a relatively light weight valve operating mechanism capable of high speed positive operation.

Another object of my invention, according to one embodiment thereof, resides in the provision of an improved valve operating mechanism adapted to permit self-alignment of the various parts whereby the manufacture, assembly, and operation of the mechanism is facilitated.

Further objects of my invention are to provide improved means in a positive valve operating mechanism for conveniently adjusting the valve relative to its seat; to provide a positive valve operating mechanism capable of assembly and disassembly as a unitary structure without disturbing or removing the engine cylinder associated therewith, the unitary assembly being mounted with the cylinder head and removable therewith according to one embodiment of my invention; to provide a positive valve operating mechanism including an operating lever capable of assembly or disassembly with or from cam operating means preferably by moving the operating lever and associated valve operating assembly outwardly in the general direction of the associated cylinder; to provide an improved arrangement of cylinder and valve operating mechanism capable of expansion and contraction under varying engine temperatures without appreciably altering the valve timing; and to provide an improved valve operating mechanism for engines particularly of the radial cylinder type although not necessarily limited thereto wherein the cam means for positively operating the valves is offset from the plane of the cylinder axes with a novel form of bell-crank lever having offset lever arms for transmitting the drive from the cam means to the valves.

Further objects of my invention are to provide improvements in guiding means for the lever arms of the positive valve operating mechanism; to provide a novel arrangement of positioning one or more of the valve operating lever arms within a gas conducting valve controlled passage for an engine cylinder; and to provide self-adjustment of the valve relative to its seat during engine operation.

Further objects and advantages of my invention will be more apparent from the following detailed description of several illustrative embodiments thereof, reference being had to the accompanying drawings, in which:

Fig. 1 is a central vertical section of an internal combustion engine constructed in accordance with the present invention, the section being taken along the axis of the engine crank shaft as indicated by the line 1—1 of Fig. 5.

Fig. 2 is a fragmentary sectional elevational view along the line 2—2 of Fig. 1.

Fig. 3 is a detail sectional view along the line 3—3 of Fig. 2.

Fig. 4 is a further detail sectional view along the line 4—4 of Fig. 1, certain of the parts being broken away.

Fig. 5 is a side elevational view of the engine on a reduced scale, parts of the cylinders and crank case being broken away to illustrate the mechanisms respectively operably associated therewith.

Fig. 6 is a detail sectional plan view along the line 6—6 of Fig. 5.

Fig. 7 is a sectional plan view looking down on one of the engine cylinders with the cylinder head removed, the section being taken along the line 7—7 of Fig. 5.

Fig. 8 is a central vertical section on an enlarged scale of a modified form of valve which may be employed in connection with the construction shown in Figs. 1 to 7 and 9 and 10.

Fig. 9 is a fragmentary side elevational view showing a modified form of valve and operating mechanism therefor.

Fig. 10 is a fragmentary sectional elevational view of the parts illustrated in Fig. 9, the section being taken along the line 10—10 of Fig. 9.

Referring to the drawings it will be noted that I have illustrated my improvements in an internal combustion engine of the three cylinder radial or Y-type, the engine including a fixed crank case 10 and radially disposed cylinders 11 secured in equiangular relation on said crank case. The cylinders 11 may have any desired suitable construction, the novel cylinder construction illustrated in the drawings not forming a part of the subject matter claimed in this application.

As illustrated in the drawings, each of the cylinders 11 may be formed of an inner sleeve 12 and an outer sleeve 13 maintained in concentric and spaced relation by a base member 14 and top member 15 which are suitably bonded to the sleeve member. The base members 14 may be provided with flanges 16 by which the cylinders may be secured to the crank case by means of bolts 17. The spaced concentric sleeves 12 and 13 provide water jacket spaces 18 along the cylinder walls which communicate through ports 19 with water jacket spaces 20 provided in the top members 15. The upper surfaces of the top members 15 are square relative to the cylinder in a longitudinal direction as viewed in Fig. 1 but slightly inclined relative to the cylinders in a transverse direction as indicated in Fig. 5.

Each cylinder is provided with a cylinder head 21 in which are formed water jacket spaces 22 communicating with the spaces 20 in the top members 15. Referring also to Fig. 7, bolts 23 are provided for securing the cylinder heads 22 to the top members 15, a suitable gasket 24 being disposed between the cylinder head and top member. A spark plug 25 is provided in each of the top members as indicated in Fig. 7.

Slidable within the inner sleeve 12 which constitutes the cylinder wall of each cylinder is a piston 26 which may be of any suitable construction and which does not in itself constitute a part of my invention as claimed in this application. The main portion of the connecting rod is indicated at 27 and may be tubular in form for lightness in weight, an annular bearing member 28 being permanently secured to the tubular rod portion 27, the bearing member being adapted to engage the crank pin of the engine.

The crank case 10 comprises a substantially cylindrical body member 29 and end members 30 and 31. The parts of the crank case are preferably aluminum or similar light weight metal or alloy castings and the body member 29 is cored as indicated at 32 for the accommodation of the cylinder 11 and as indicated at 33 for the accommodation of valve operating means which will be presently described in detail. The end member 30 of the crank case is essentially bell-shaped and centrally apertured at the forward end thereof for the reception of a crank shaft 34. This crank shaft is journaled in ball and race types of bearings 35 and 36 mounted in the crank case and arranged adjacent the ends of the crank shaft, the bearing 35 being arranged in an enlargement 37 adjacent the central aperture at the forward end of crank case member 30 and the bearing 36, of considerably larger diameter than bearing 35, being mounted in inturned flanges 38 at the forward margin of the body member 29 of the crank case.

The rear portion of the crank shaft 34 is provided with an enlargement in which is journaled, eccentrically with respect to the axis of the crank shaft, a spindle 40 which projects rearwardly beyond the end of the crank shaft to provide a crank pin 41.

The spindle 40 is journaled adjacent its rear end by a roller bearing 42 arranged at the rear end of the enlarged portion and a ball and race type bearing 43 journaled in the forward end of spindle 40 at the forwardly disposed end of the enlargement of the crank shaft. The spindle 40 is maintained in position within the bearings 42 and 43 by a shoulder 44 which abuts the forward face of the bearing 43 and by a nut 45 and lock washer 46 secured to the forward end of spindle 40.

The rearwardly projecting end 41 of the spindle 40 forms the engine crank pin on which is journaled the annular bearing member 28 connected to the aforesaid connecting rod member 27, and also journals the annular bearing members 47 and 48 on the connecting rods of the remaining cylinders. Referring also to Figs. 2 and 3, it will be noted that the annular bearing member 47 is offset forwardly to a slight extent relative to its connecting rod member and that the annular bearing member 48 is offset rearwardly to a slight extent relative to the tubular member 27 of its connecting rod. All of the bearing members 28, 47 and 48 are directly journaled on the crank pin 41 which in turn is rotatably journaled relative to the crank shaft 34.

The bearing members 47 and 48 together with a rearwardly offset portion of the bearing member 28 are disposed in side to side relation on the crank pin 41, while the forward edge of bearing member 47 abuts a shoulder 49 on the spindle 40 and the forwardly offset portion of the bearing member 28 abuts another shoulder portion 50 at its forward edge. The spindle 40 is centrally cored as indicated at 51 and at the rearward margin is internally threaded as indicated at 52. A plug 53 is received within this threaded portion and abuts the rearward margin of the bearing member 28 to maintain the bearing members 28, 47 and 48 in assembled relation. The bearing member 28 is slotted as indicated at 54 and 55 partially about its periphery so that any two adjacent connecting rods of the group of three will not come into contact even when the connecting rods are at the minimum relative angle. It is noted that with the above construction all of the connecting rods bear directly on the engine crank pin and all are of the same length so as to insure uniform compression ratio of all of the cylinders of the engine.

During operation of the engine at high speed, the bearing members 28, 47 and 48 of the crank pin 41 and spindle 40 will exert relatively great centrifugal forces on the spindle bearings 42 and 43, it being apparent that the bearing 42 must carry the major portion of this load. In order to distribute this load more uniformly between the bearings 42 and 43 and to generally counterbalance the moving parts of the engine I have provided a novel distribution of counterweights fully disclosed in my aforesaid co-pending application. I have herein illustrated a portion of such counterweighting, a counterweight being illustrated in the form of the eccentric mass 56 integral with the enlarged portion and disposed diametrically opposite the bearing 42. Inasmuch as my novel system of counterbalancing is not in itself a part of the invention claimed in this application, the details of the counterweighting system will not be further illustrated or described in this application.

My valve operating mechanism which, together with the parts associated therewith constitutes the subject matter of this application, is capable of improved operation at relatively high engine speeds approximating 5,000 to 10,000 R. P. M., although I do not limit my invention in this respect. Referring particularly to Figs. 1 and 4 to 7 inclusive, the construction and arrangement of the engine valves and operating means therefor will be described.

The body portion 29 of the crankcase is provided with a transversely disposed supporting partition 57 in which a hollow stub-shaft 58 is supported in alignment with the axis of the crankshaft 34. The partition 57 divides the crankcase body 29 into the crankcase proper intermediate the partition 57 and bearing 36 and the cam receiving chamber 57ª located intermediate the partition and the end cover member 31. A gear 59 is provided with an integral disc of larger diameter than that of the gear and is journaled upon this stub-shaft and maintained in position by means of a bolt 60. The disc 61 is provided with slot-like apertures 63, elongated in a radial direction, one of which is adapted for engagement with a lug 64 projecting from the plug 53 threaded into the end of the crank pin 41. The gear 59 and disc 61 are given equal rotation with the crankshaft and the slot 63 permits relative movement other than rotation of either the stub-shaft or crankshaft 34 in the event of deflection of either shaft. Three cam shafts 65 are journaled in the supporting partition 57 and end member 31 and each cam shaft is provided with a gear 66 arranged in equidistant and equiangular position relative to the axis of the stub shaft 58 and the crankshaft 34. The gears 66 are each of a diameter twice that of gear 59 so that each of the cam shafts 65 receives equal rotation in the opposite direction at one-half the speed of the crankshaft 34. The arrangement of the shafts in the crankcase is such that a line between the axes of two adjacent shafts will be bisected by a line normal thereto and passing through the axis of a valve operating shaft 67 journaled between the cylinder head 21 and the top member 15 of a cylinder 11. Each shaft 65 has four cams 68 secured thereto against relative rotation. The cams 68 are arranged in pairs on the shaft 65, one pair of cams being adapted to operate the intake and exhause valves of one cylinder while cooperating with a pair of cams on the next adjacent shaft and the other pair of cams is adapted to cooperate with a pair of cams on the third shaft to operate the intake and exhaust valves of another cylinder.

The novel arrangement of camshafts 65 together with their drive from the crankshaft especially adapted for a radial engine does not form a part of the subject matter claimed in this application.

Each valve operating shaft 67 has an arm 69 fixed thereto which supports a valve 70 at the outer end thereof. The valves 70 form the exhaust valves for the engine cylinders and each cooperates with a valve seat insert 71 provided in the upper portion of the top members 15. Thus the valves 70 cooperate with the valve seat insert 71 to close the exhaust passages 72 provided in the cylinder head 21. Each valve operating shaft 67 is also provided with an operating arm 73 upon the free end of which is disposed a roll 74 adapted to cooperate with the cams 68 fixed to the camshafts 65.

Each cam upon the shafts 65 cooperates with a suitably shaped cam provided upon an adjacent shaft so that both cams remain in contact with roll 74 at all times. These cams are so shaped that when the cam on one shaft begins to lift the roll 74, the cam surface of the cam on the other shaft allows the roll 74 to approach the axis of the latter shaft. In the construction shown in Fig. 5 the cams which open the valves 70 are in the general form of an involute tooth and the cams which close the valves 70 and cooperate with the first mentioned cams are essentially circular in outline with a wedge shaped portion removed therefrom. The cam operating shafts 67 are journaled in aligned recesses 75 and 76 provided in the contacting faces of the cylinder heads 21 and top portions 15 respectively. The recesses 76 are enlarged as indicated at 77 for the reception of a sleeve 78 to which is fixed an operating arm 79 for an intake valve 80.

The operating shafts 67 and 78 are telescoped one within the other so that one forms a bearing for the other shaft while additional bearings for these operating shafts are provided by the cylinder heads 21 and top portion 15 of the cylinders. The operating arms 69 and 79 may be provided with annular shoulder portions 81 which cooperate with correspondingly shaped recesses 82 in the cylinder heads and cylinder top members to prevent axial displacement of the valve operating shafts.

An operating arm 83 is fixed to the valve operating sleeve 78 and the free end of this arm terminates in a roll 74 as previously described. It will be apparent that the arm 83 together with the sleeve or shaft 78 and the arm 79 form a bell crank lever, the lever portions or arms 79 and 83 thereof being spaced axially of the sleeve 77. The cylinder top members 15 and cylinder heads 21 may be provided with complementary extension members 84 adjacent the ends of the recesses 75 and 76 to provide outboard bearings for the longer operating shafts 67 and 78. The bosses 84 will be different lengths for two of the cylinders and the third cylinder will not require an outboard bearing.

As will be noted in Figs. 1 and 7, the forwardly disposed pair of cams 68 shown in Fig. 1 cooperates with a pair of cams on another shaft 65 to operate the valve means for the cylinder shown in Fig. 1, the valve operating arms 83 and 73 being mounted on the shafts 67 and 78 at points adjacent the side of the cylinder head 21 indicated in Fig. 1. The valves of another cylinder require shafts of a length indicated in full line in Fig. 7 and the operating arms therefor cooperate with the pair of cams 68 shown in the rearmost position in Fig. 1. The cams for operating the valves of the remaining cylinder are not shown in Fig. 1 but are mounted on the two remaining camshafts 65 and occupy the intermediate position between the pairs of cams shown on the camshaft 65. In the case of the last mentioned cylinder the valve shafts will be of an intermediate length and the extension members 84 will terminate at a point indicated by the dot and dash line 85 of Fig. 7. Casing members 86 cover the cored out openings 33 in the crankcase body portion 29 and also cover the valve operating arms 73 and 83. These casing members may be attached to the crankcase supporting member 29 by screws 87 as indicated in Fig. 6. It will be noted that the openings or slots 33 provide guides for the arms 73 and 83.

My valve operating mechanism as thus far described may be readily assembled and disassembled as a unitary assembly into engagement with or out of engagement from the operating cams 68 for each valve operating mechanism including arms 73 and 83 in the general direction of the associated cylinder, viz., outwardly or inwardly. The arms 73 and 83 are thus freely engaged by the cams so that the arms may be withdrawn or assembled into engagement with the cams by a simple outward or inward movement thereof. In Figs. 1 to 7 the cylinder is illustrated as forming a unitary assembly with the valve operating mechanism, the cylinder head structure 21 being removable independently of this assembly.

By providing the aforesaid outwardly extending arms 73 and 83 carried by the outer end of the associated cylinder and extending inwardly in the general direction of the cylinder for freely engaging the operating cams 68, the cylinder may expand and contract under temperature variations without binding the operating mechanism. When such temperature changes take place the lever arms 73 and 83 merely slightly move in or out at the cams 68, the cam operated valve timing being unchanged for all practical purposes and noticeable results in the engine operation.

It will further be apparent that the cams 68 may be located offset from the plane of the cylinder axes, the bell cranks having their lever arms offset in the direction of their pivots provided between the companion bearing portions provided by the cylinder and cylinder head.

By locating the lever arms 69 and 79 for operation in the respective valve controlled exhaust and intake gas passages 72, I have provided, among other things, an encasing for the lever arms, improved the compact characteristics of engines, and decreased air flow resistance which is of importance in connection with aircraft installations.

Referring to Fig. 8 a modified form of valve and operating means therefor is disclosed comprising a valve member 88 having a seating portion 89 adapted to engage a valve seat insert 71 and a second seating portion 90 adapted to engage a beveled head member 91 secured to or forming an integral part of a valve operating arm 69'. A backing ring 92 may be welded or otherwise suitably secured to the operating arm 69' to retain the valve member 88 in position with the desired amount of play relative to the valve operating arm or stem 69'. The valve 88 is self-adjustable during operation and assembly, it being apparent that the valve may rotate or slightly tilt. The valve 88 may be substituted for the valves 70 and 80 of the Fig. 1 embodiment or for the valve 70' in my Fig. 10 embodiment hereinafter described.

Referring to Figs. 9 and 10, a modified form of valve and valve operating mechanism is disclosed. In this embodiment the top member 15' of the cylinder is provided with an upper surface 33' which is square with the cylinder and a cylinder head 21' is secured thereto. A poppet valve 70' is provided with a hollow stem 93 which is internally threaded to receive the lug 94 of a guide means 95. A lock nut 96 may be provided to maintain the lug 94 and stem 93 is locked adjustment. A valve guide 97 is provided to slidably receive a stem 93. By loosening the nut 96, the valve stem 93 may be rotated on the threaded lug 94 to axially adjust the stem relative to lug 94 and thereby adjust the valve 70' relative to its seat.

A slide member 98 is pivotally connected to the end of operating arm 99 and slidably received within the guide 95. The operating arm 99 is secured to a valve operating shaft 67' or 78' to which are also secured operating arms 73' and 83' extending to the valve operating cams as in the prior embodiment. The cam members 68' in the present embodiment are again shaped so as to afford positive opening and closing operations of the valve 70'. In this instance the cam for opening the valve 70' is essentially wedge shaped, while the cam employed for closing the valve 70' is of circular outline with an arcuate portion removed therefrom. The outlines of the cams 68' are so shaped that as one cam is lifting the operating arm 73' or 83' the other cam member allows such lifting movement while maintaining the cam surfaces of both cams in contact with the end of the operating arm.

As in the case of the previous embodiment it will be apparent that the respective pairs of laterally extending valve actuating arms and downwardly extending cam actuated arms form bell crank levers, the component lever arms of each bell crank being spaced axially of the rocking sleeve or shaft to which the pairs of arms are attached.

It will be noted that in Fig. 10 the lever arm 99 is connected by a slide member 98 to positively reciprocate the valve stem 93 and to compensate for the variation in distance between the lever support and valve stem axis during reciprocation of the stem and valve. The slide 98 acts substantially along the axis of the valve stem and slides transversely to said axis.

In the embodiment of my invention illustrated in Figs. 9 and 10, the valve operating mechanism may be readily assembled and disassembled as a unitary assembly into engagement with or out of engagement from the operating cams 68' by moving the operating mechanism including arms 73' and 83' in the general direction of the associated cylinder, viz., outwardly or inwardly as in the case of the Fig. 1 embodiment. However, in Figs. 9 and 10, the valve operating mechanism for each cylinder may be assembled or disassembled as a unitary assembly without disturbing the associated cylinder since each mechanism may be moved as a unitary assembly with the cylinder head 21'.

When the cylinder head 21' is removed from the cylinder with the valve operating mechanism, the valves 70' may then be readily reached from the under side of the cylinder head and the valves unscrewed to release the driving mechanism from the valve stems at the threaded lugs 94.

An advantage, in addition to those aforesaid, of my sliding member 98 resides in facilitating the manufacture and assembly of the valve operating mechanism by providing a self-alignment of the parts without requiring extreme accuracy of machining and location of parts. Thus, the distances between the axes of the valve stems 93 and shafts 67', 78' may slightly vary since the slide 98 will readily accommodate itself to such variations.

In Figs. 1 to 8 as well as in Figs. 9 and 10, the cams for operating the bell crank levers are located laterally adjacent the inner end of the cylinders while the supports for the actuating bell crank levers are spaced circumferentially of the cams, such arrangement being of particular advantage for radially arranged cylinders although not necessarily limited thereto. In order to efficiently transmit the positive valve movement from the cams, the cam actuated bell crank lever arms 73, 83 and 73', 83' extend upwardly and outwardly from the cams to the bell crank lever supports, the other lever arms 69, 79 or 99 being offset from the respectively connected cam actuated lever arms so as to extend inwardly at the outer cylinder ends from the lever supports to the valves.

As many changes could be made in the above constructions and many apparently widely different embodiments of my invention could be made without departing from the spirit and scope thereof, it is intended that all matter contained in the above description or shown in the accompanying drawings shall be interpreted as illustrative and not in a limiting sense.

What I claim is:

1. In an internal combustion engine having a cylinder, a head removably secured to said cylinder and provided with a valve port therein, a poppet valve in said head movable to open and close said port, a valve operating shaft, said cylinder and head having companion recesses journalling said shaft therebetween, means fixed to said shaft and connected to said valve for positively reciprocating said valve upon oscillation of said shaft, and means for oscillating said shaft.

2. In an internal combustion engine having a cylinder, a head removably secured to said cylinder and provided with valve ports therein, poppet valves in said head movable to open and close said ports, a pair of valve operating shafts one of which is in the form of a sleeve telescoped over the other of said shafts whereby each shaft provides a bearing for the other, said cylinder and head having aligned recesses journalling said valve operating shaft therebetween, means for rotating said shafts, and means respectively interconnecting said shafts and valves for positively moving said valves upon rotation of said shafts.

3. In an internal combustion engine having a cylinder, a head removably associated therewith, said cylinder and head having seating faces, a poppet valve, a bell crank lever having an arm adapted to operate said valve and a second arm, and means for actuating said second arm, said cylinder and head having companion recesses formed in their seating faces, said bell crank lever having a shaft connecting said arms and journaled in said recesses.

4. In an engine having a cylinder and a pair of poppet valves, bell crank levers each having an arm adapted to positively operate one of said valves, means operating the other arms of said levers, and means supported by said cylinder for rockingly journalling said levers, said levers having shaft portions intermediate their arms, one of said shaft portions being journalled within the other.

5. In an engine valve operating mechanism, a valve stem, means for positively operating said stem, said stem having a pair of axially spaced shoulders projecting therefrom, a valve loosely mounted between said shoulders and having an aperture through which said stem passes.

6. In an engine valve operating mechanism, a valve stem, means for positively operating said stem, said stem having a pair of axially spaced shoulders projecting therefrom, a valve loosely mounted between said shoulders and having an aperture through which said stem passes, one of said shoulders and said valve having engaging bevelled faces.

7. In an engine having a cylinder and a pair of poppet valves, bell crank levers each having an arm adapted to positively operate one of said valves, means operating the other arms of said levers, and supporting means rockingly journalling said levers, said levers having bearing portions intermediate their arms, one of said bearing portions being journalled within the other.

ROGER K. LEE.